United States Patent [19]

Tsuchiya et al.

[11] 3,984,381

[45] Oct. 5, 1976

[54] METHOD FOR PRODUCING RESINS FOR PRINTING INKS

[75] Inventors: Shozo Tsuchiya, Kawasaki; Hideo Hayashi; Hisatake Sato, both of Yokohama, all of Japan

[73] Assignee: Nippon Oil Company Ltd., Tokyo, Japan

[22] Filed: June 13, 1975

[21] Appl. No.: 586,805

Related U.S. Application Data

[63] Continuation of Ser. No. 427,665, Dec. 26, 1973, abandoned.

[30] Foreign Application Priority Data

Dec. 29, 1972 Japan.................................. 48-1919
Jan. 23, 1973 Japan.................................. 48-9138

[52] U.S. Cl............................... 260/78.41; 106/27; 106/32; 260/18 VP; 260/23 AR; 260/33.6 UA

[51] Int. Cl.² .................. C08F 18/14; C08G 63/00; C08F 110/00; C08L 91/00

[58] Field of Search........................... 260/78.4, 93.1

[56] References Cited

UNITED STATES PATENTS 3,084,147  4/1963  Wilks................................ 260/93.1
3,775,381  11/1973  Hayashi et al. ................ 260/78.4 D

*Primary Examiner*—Joseph L. Schofer
*Assistant Examiner*—Herbert J. Lilling
*Attorney, Agent, or Firm*—Sherman & Shalloway

[57] ABSTRACT

A method for producing a resin for printing ink, which comprises reacting a dicylopentadiene resin with an unsaturated carboxylic acid or its anhydride, the proportion of the unsaturated carboxylic acid or its anhydride being 0.01 to 0.5 mol per 100 g of the dicyclopentadiene resin, and then esterifying the acid-modified resin so obtained with an aliphatic monohydric alcohol in an amount of 0.2 to 2.0 mols per mol of the unsaturated carboxylic acid or its anhydride used in the reaction.

13 Claims, No Drawings

METHOD FOR PRODUCING RESINS FOR PRINTING INKS

This is a continuation of application Ser. No. 427,665, filed Dec. 26, 1973, and now abandoned.

This invention relates to a method for producing a novel high-softening modified resin for use in preparation of a printing ink.

More specifically, this invention relates to a method for producing a modified resin for printing ink, which comprises esterifying an acid-modified resin, which is an adduct formed between an unsaturated carboxylic acid or its anhydride and a hydrocarbon-soluble resin synthesized from cyclopentadiene, dicyclopentadiene or its alkyl-substituted derivative, with a monohydric alcohol.

Varnishes for printing ink which have previously been in wide use are resin varnishes obtained by dissolving a resin such as an alkylphenol resin, rosin-modified phenol resin, or maleic acid resin in a dry oil such as linseed oil. Of these, the rosin-modified phenol resin has been most frequently used. A vehicle for printing ink comprising the rosin-modified phenol resin and a solvent and/or a drying oil has good quality, but has the defect that the supply of rosin is unstable and its cost is high, because it is a naturally occurring substance. On the other hand, petroleum resins prepared by polymerizing cracked oil fractions obtained in large quantities as by-products in the petrochemical industry or petroleum having the advantage of stable supply and cost, but their quality is not satisfactory. Thus, resins having satisfactory properties for use in the preparation of printing inks have scarcely been found in the petroleum resins.

It has been extremely difficult to develop synthetic resins that can be used to prepare printing inks, especially gravure printing inks and offset printing inks.

A gravure printing ink, especially a paper gravure printing ink, which has previously been in use is a varnish prepared by dissolving a maleic acid resin or a rosin-type derivative such as lime rosin, or a rosin-modified phenol resin in an organic solvent such as toluene. In spite of the fact that various other synthetic resins other than the rosin-type resins have been developed, almost none of them can be used for gravure printing inks.

Basic properties required of paper gravure printing ink are:

1. It should have a high softening point and a high drying speed;
2. It should have a relatively low molecular weight, and exhibit a moderate solution viscosity when dissolved in an organic solvent such as toluene;
3. It should have good dispersibility in a pigment;
4. It should have good viscosity stability when made into an ink; and
5. It should have good gloss at the time of printing, and give printed matter of uniform quality, namely, have a good printing effect.

Attempts have been made to use petroleum resins, which are obtained by the cationic polymerization of fractions resulting as by-products from thermal cracking of petroleums, or addition-reaction products of them with maleic anhydride for the preparation of gravure printing inks because of their low cost. However, such resins exhibit poor performance in all of gloss, drying properties, dispersibility in pigments, and stability of the viscosity of ink with time, and printing inks cannot be prepared from such resins alone. Even when such resins are used conjointly with lime rosin, the kind of a pigment used for preparing gravure printing inks is limited. In the circumstances, therefore, these petroleum resins have only been auxiliarily used for preparing some gravure inks.

There was another attempt to prepare a resin for gravure printing ink by adding maleic anhydride to an aromatic petroleum resin and then esterifying the addition reaction product with an alcohol. However, if in this attempt the softening point of the resin is elevated in order to improve the drying properties of the gravure printing ink, the viscosity of a solution of the resin in toluene increases. On the other hand, gravure inks are required to be maintained at a constant viscosity for printing purposes, but when a resin having such a high viscosity is used, an ink of a constant viscosity cannot be obtained unless the concentration of the resin in the ink is decreased. The ink so obtained has the defect of being inferior in various properties such as gloss or abrasion resistance to, for example, an ink prepared from lime rosin having a relatively low solution viscosity.

It has been known that when cyclopentadiene, dicyclopentadiene or its alkyl-substituted derivative is heat polymerized at a temperature as high as 250° to 350°C. in the presence of an inert hydrocarbon solvent such as benzene, toluene, xylene or isooctane, a resin soluble in a hydrocarbon such as benzene, toluene, xylene, cyclohexane or isooctane is obtained. Even in the absence of an inert hydrocarbon solvent, heat-polymerization at a temperature of as high as 250° to 350°C. gives a resin that is soluble in the hydrocarbon.

In the present specification and appended claims, the resin obtained in this matter is termed a "dicyclopentadiene resin". The dicyclopentadiene resins are soluble in a hydrocarbon solvent such as benzene, toluene, xylene or solvent naphtha, but since they do not possess a polar group, inks prepared from these resins have poor properties such as dispersibility in pigments, gloss or viscosity stability, and cannot be used for preparing gravure printing inks.

The basic properties required of an offset printing ink, are as follows:

1. It should have suitable values showing flowability, such as viscosity and yield value.
2. Since lines are formed on a flat surface by the contact of water with the ink, an interfacial balance should be maintained between the water-retaining part and the ink-adhering part of the printing press.
3. It should have good dispersibility in pigment.
4. It should give printed matter in which the printed surface has good gloss and which is of uniform quality.
5. It should permit a rapid setting time and a rapid drying time and should not cause blocking.
6. It should give printed matter in which the printed surface has good abrasion resistance.

In order to meet these requirements of offset printing inks, the resins to be used should have the following properties in the main.

1. It should have a high softening point and a high molecular weight.
2. It should have a polar group having good affinity with a pigment.
3. It should have sufficient solubility in a high boiling hydrocarbon solvent with a low aromatic content which is used for offset printing inks.

4. It should have sufficient solubility in a dry oil such as linseed oil.

Since as mentioned before, the dicyclopentadiene resin does not possess a polar group, an ink prepared by adding various solvents and pigments to this resin has the defect that the dispersibility of the resin in the pigment is poor, and the printed surface is non-uniform with poor ink adhesion and gloss. Thus, such a resin cannot be used for preparing an offset printing ink.

An attempt was also made to manufacture a resin for printing inks by reacting an acrylic acid ester with the dicyclopentadiene resin, hydrolyzing the resulting addition-reaction product, and reacting the resultant carboxylic acid-containing resin wth a polyhydric alcohol and a higher unsaturated fatty acid. If the softening point of this resin is increased in order to form an offset printing ink having the same setting time and drying time as the conventional printing inks, the solubility of the resin in a petroleum hydrocarbon solvent used as a solvent for an offset printing ink becomes poor, and the gloss is reduced extremely. On the other hand, the softening point of the resin should be decreased in order to improve its solubility in an ink solvent, in which case the setting time and the drying time become longer and the ink is not feasible for practical applications.

It has been known to prepare an alkyd resin by reacting a resin obtained by heat-polymerization of dicyclopentadiene and maleic anhydride as a polybasic acid component, with a polyhydric alcohol and a dry oil. The alkyd resin obtained has a high molecular weight, and therefore, it has poor solubility in high boiling hydrocarbon solvents and dry oils used for inks, and when it is made into an ink, the flowability of the ink is poor, and the gloss of the printed matter is inferior. Furthermore, there is considerable misting, and these drawbacks preclude such an alkyd resin from being used for preparing offset printing inks.

Accordingly, an object of this invention is to provide a low cost vehicle for printing ink which is to be prepared from a material obtainable in large quantities from the petrochemical industry at low cost and which because of its superior properties as a printing ink vehicle, can supersede vehicles prepared from rosin-modified phenol resins.

Another object of this invention is to provide a method for producing easily and economically a resin having superior properties for use in gravure printing inks and offset printing inks, using a material obtainable at low cost from the petrochemical industry.

The above objects of this invention can be achieved by a method for producing a resin for printing ink, which comprises reacting a dicyclopentadiene resin with an unsaturated carboxylic acid or its anhydride, the proportion of the unsaturated carboxylic acid or its anhydride being 0.01 to 0.5 mol per 100 g of the dicyclopentadiene resin, and then esterifying the acid-modified resin so obtained with an aliphatic monohydric alcohol in an amount of 0.2 to 2.0 mols per mol of the unsaturated carboxylic acid or its anhydride used in said reaction.

The term "dicyclopentadiene resin", as used in the present specification and the appended claims, denotes a hydrocarbon-soluble resin which is obtained by heat polymerizing cyclopentadiene, dicyclopentadiene or an alkyl-substituted derivative of any of these in the presence or absence of an inert hydrocarbon solvent in the absence of a catalyst. The dicyclopentadiene resin per se is well known in the art. One preferred method for producing the dicyclopentadiene resin involves heat polymerizing the above-mentioned monomer at a temperature of 250° to 350°C. for 10 minutes to 10 hours in the absence of a solvent or in the presence of a solvent in which case the concentration of the monomer in the solvent is adjusted to 30 to 80% by weight, and then separating the unreacted monomer, oligomers and solvent. Preferably, the heat polymerization is caried out using a solvent because it permits easy removal of the heat of reaction and the control of the molecular weight and softening point of the resulting resin.

In the production of the dicyclopentadiene resin, the molecular weight and softening point of the resulting resin can be controlled by suitably selecting a combination of the concentration of the monomer, the reaction temperature and the reaction time.

One of the important features of the method of this invention is that by properly selecting the reaction conditions, it is possible to produce a resin which is suitable either for preparing a gravure printing ink or for preparing an offset printing ink. As is clear from what has been stated hereinabove, there are fairly large differences between the requirements of resins for gravure printing ink and those of resins for offset printing ink. In view, too, of the fact that there has been no synthetic resin which can be used both for preparing gravure printing inks and for preparing offset printing inks, the above feature of this invention is indeed surprising.

Preferably, the dicyclopentadiene resin used in this invention has a softening point of at least 70°C. Resins having a high softening point, such as more than 200°C., can be used in this invention, but are not preferred since they frequently contain an insoluble portion when dissolved in a hydrocarbon solvent.

It is not altogether necessary that the cyclopentadiene, dicyclopentadiene or an alkyl-substituted derivative of any of these used as a starting material for the above resin be of high purity. But preferably, the resin should contain at least 80% by weight of the cyclopentadiene, dicyclopentadiene or an alkyl-substituted derivative thereof. For example, there can be used a concentrated fraction which is obtained by dimerizing cyclopentadiene and methyl cyclopentadiene contained in a $C_5$ fraction of a by-product of a high temperature thermal cracked oil such as naphtha to form a mixture containing dicyclopentadiene, dimethyl cyclopentadiene, cyclopentadiene/methylcyclopentadiene codimer, cyclopentadiene/isoprene codimer, and cyclopentadiene/piperylene codimer, and then distilling the mixture to remove a greater part of $C_5$ components such $C_5$ olefin and $C_5$ paraffin.

Where the alkyl-substituted derivative of cyclopentadiene or dicyclopentadiene is used as a material for producing the dicyclopentadiene resin, the alkyl group in the material preferably has 1 to 3 carbon atoms.

The reaction of forming the acid-modified resin from the dicyclopentadiene resin and an unsaturated carboxylic acid or its anhydride may be performed either by a two-step method or by a one-step method. The two-step method comprises heat-polymerizing cyclopentadiene, dicyclopentadiene or its alkyl-substituted derivative to form a dicyclopentadiene resin and then reacting this resin with an unsaturated carboxylic acid or its anhydride. The one-step method involves heat polymerizing the monomer and and unsaturated carboxylic acid or its anhydride simultaneously to produce the acid-modified resin.

A preferred embodiment of the two-step method used in this method comprises adding an unstaurated carboxylic acid or its anhydride to the dicyclopentadiene resin produced under the reaction conditions described hereinabove. According to this method, the acid-modified resin can be produced by adding the unsaturated carboxylic acid or its anhydride in an amount of 0.01 to 0.5 mol per 100g of the dicyclopentadiene, and allowing them to react with each other in the absence of a catalyst or in the presence of a radical initiator such as an organic peroxide for about 30 minutes to 15 hours at a temperature of 100° to 300°C., preferably 150° to 250°C.

A preferred embodiment of the one-step method used in this invention comprises adding an unsaturated carboxylic acid or its anhydride to the reaction system of heat polymerizing cyclopentadiene, dicyclopentadiene or its alkyl-substituted derivative in the presence or absence of a solvent at a temperature of 170° to 350°C. The carboxylic acid or its anhydride is added to the reaction system before or during the polymerization.

The unsaturated carboxylic acid or its anhydride used in this invention has 3 to 16 carbonators. Examples of suitable unsaturated carboxylic acids or anhydrides thereof are acrylic acid, methacrylic acid, maleic acid, maleic anhydride, tetrahydrophthalic acid, tetrahydrophthalic anhydride, fumaric acid, citraconic acid, and itaconic acid.

The sutiable ratio of the dicyclopentadiene resin and the unsaturated carboxylic acid or its anhydride to be added to it is such that 0.01 to 0.5 mol of the unsaturated carboxylic acid or its anhydride is used per 100 g of the dicyclopentadiene resin.

However, when it is desired to use the resin of this invention for preparing gravure printing inks, it is especially preferred that the amount of the unsaturated carboxylic acid or its anhydride should be 0.01 to 0.4 mol per 100g of the dicyclopentadiene resin. If the amount of the unsaturated carboxylic acid or its anhydride is smaller than 0.01 mol per 100 g of the dicyclopentadiene resin, the amount of the polar group of the resin to which the acid has been added is small, in which case the resin has poor dispersibility in pigments and a printing ink prepared from this resin has poor flowability and exhibits a poor printing effect. If it is larger than 0.5 mol, it is difficult to perform an addition reaction between the carboxylic acid or its anhydride and the dicyclopentadiene resin. When the resin of this invention is used for preparing an offset ink, it has poor solubility in solvents and dry oils for use in offset ink vehicles. Accordingly when these resins are used for preparing offset printing ink, the resulting ink has poor flowability and gives printed matter of poor gloss. Thus, these resins are not suitable for preparing printing inks.

When it is desired to use the resin in accordance with this invention for preparing gravure printing ink, it is desirable to use not more than 0.4 mol of an unsaturated carboxylic acid or its anhydride per 100g of the dicyclopentadiene resin. The reason is as follows: When a gravure ink varnish is prepared by dissolving the esterified resin to be described, in toluene, the viscosity of the solution becomes unusually high and the solution cannot easily be used as an ink. Thus, there is an increasing tendency that the gloss of the ink is reduced, and a uniform printed matter cannot be obtained.

If the dicyclopentadiene resin used in this invention is addition-reacted with the unsaturated carboxylic acid or its anhydride in the amount specified above under the conditions described above, it is possible to add the unsaturated carboxylic acid or its anhydride to the dicyclopentadiene resin in a conversion of nearly 100%. Accordingly, it is not necessary to remove the unreacted acid in particular. If desired, however, a tiny amount of the unreacted acid may be removed by blowing a hot inert gas, for example.

When the acid-modified resin in accordance with this invention is to be produced by the one-step method described above, it is preferred that the mixing ratio be selected so that 0.001 to 0.5 mol (in the case of using the reaction product for preparation of a gravure printing ink, 0.01 to 0.5 mol) of the unsaturated carboxylic acid or its anhydride is addition-reacted per 100g of the cyclopentadiene, dicyclopentadiene or an alkyl-substituted derivative.

According to the method of this invention, the acid-modified resin obtained in the manner described above is then esterified with an aliphatic monohydric alcohol. The amount of the aliphatic alcohol is 0.20 to 2.0 mols, preferably 0.25 to 1.0 mol, per mol of the unsaturated carboxylic acid or its anhydride used for preparing the acid-modified resin. The esterification reaction is carried out by adding the aliphatic monohydric alcohol to the acid-modified resin in the heat-melted state or in the form of a solution in a hydrocarbon solvent such as benzene, toluene or xylene, and then heating the mixture at 180° to 250°C. for 30 minutes to 10 hours.

The aliphatic monohydric alcohol used in this invention may be a lower alcohol such as methyl alcohol, ethyl alcohol, or normal propyl alcohol, or a higher alcohol such as nonyl alcohol, decyl alcohol or lauryl alcohol. These alcohols may be used either alone or as an admixture of two or more. In the case of using the resulting resin for preparing an offset printing ink, the monohydric alcohol to be used should be a higher monohydric saturated alcohol or higher monohydric unsaturated alcohol having at least 6 carbon atoms. Advantageously, the higher monohydric alcohol having at least 6 carbon atoms is one prepared commercially, for example, a straight-chain or branched chain alcohol such as heptanol, isodecanol or tridecanol to be synthesized by the oxo method or the Ziegler method, an alcohol obtained by reducing coconut oil, or oleyl alcohol obtained from spermaceti.

If a lower alcohol having not more than 6 carbon atoms is used, the solubility of the esterified product in a high boiling hydrocarbon solvent for ink becomes poor, and the esterified product has deteriorated properties for use as a resin for offset printing ink.

The upper limit of the number of carbon atoms of the monohydric alcohol used in this invention is not specified in particular, but from an economical point of view, those having not more than 22 carbon atoms are preferred.

The esterification reaction is performed by using a reactor maintained at atmospheric pressure or an elevated pressure which is adapted to be heated and stirred. If desired, a device may be provided which can remove the water produced as a by-product during the reaction. If an acid-modified resin having added thereto a dibasic acid anhydride is esterified with an alcohol in an amount of not more than 1 mol per mol of the anhydride, water is not generated at the time of esterification, and therefore, the reaction can easily proceed. In this case, it is not necessary to provide a water-removing device. When the esterification reaction is performed using a solvent, the solvent is, if desired, removed by distillation after the esterification reaction.

If the amount of the higher monohydric saturated or unsaturated alcohol is less than 0.2 mol per mol of the unsaturated carboxylic acid or its anhydride, the solubility of the resulting esterification reaction product in a solvent for ink is poor and the resulting ink has poor properties, as in the case of using the acid-modified resin as such.

If the amount of the alcohol is more than 2 mols, the esterification reaction becomes difficult, and the resulting resin tends to have a lower softening point. Thus, in this invention, it is preferred that the amount of the higher monohydric alcohol be 0.25 to 1.0 mol.

When a polyhydric alcohol is used instead of the monohydric alcohol, the solubility of the resulting esterified product becomes poor, and also a solvent-insoluble gel is sometimes formed at the time of esterification. Thus, attempts to prepare an ink from such a product would result in poor flowability and gloss, and this considerably impairs the adaptability of the esterification product as a resin for preparing an offset printing ink.

Furthermore, in the case of using the polyhydric alcohol, a polyester-forming reaction takes place between 2 or more molecules of the acid-modified resin and the polyhydric alcohol, and therefore, the molecular weight of the product increases or depending upon the conditions, the product becomes insoluble in an organic solvent. Thus, when the product is desired to be used for preparing a gravure printing ink, the viscosity becomes too high or the product cannot be formed into a varnish.

The resin obtained by the above method should generally have a softening point of at least 100°C. If the softening point is lower than 100°C., the resulting printing ink causes frequent misting and suffers from an extreme reduction in drying speed, and blocking tends to occur.

By properly adjusting the reaction conditions, the resin in accordance with this invention can be used either for producing offset printing inks or for preparing gravure printing inks. This is a great feature of the present invention.

When the resin obtained by the method of this invention which has a high softening point is used for preparing a gravure printing ink, a solution of the resin in toluene has a low viscosity suitable for use as a gravure ink varnish, as compared with a resin which is obtained by esterifying an adduct formed between an aromatic petroleum resin and maleic anhydride. Furthermore, the gravure printing ink prepared from the resin of this invention is superior to the gravure printing ink in respect of printing effects and printability such as drying property, gloss or uniform adhesion, provided that the softening points of the two resins are much the same. This is due to the fact that the resin obtained by the method of this invention has quite a different chemical structure from that of the petroleum resin.

Also, the resin in accordance with this invention has the following features for use in preparing gravure printing inks.

1. The resin obtained by the method of this invention can be used alone for preparing an ink of various colors, and exhibits printing effects, printability and viscosity stability same as, or greater than, those of the conventional rosin-type resins which have been used for preparing gravure printing inks.

2. Gravure inks can be prepared from the resin of this invention in accordance with the same recipe and the same manufacture methods as have been used for the conventional rosin-type resins. Accordingly, no new equipment is required for preparing the inks. A gravure printing ink can be prepared by adding the resin to an aromatic hydrocarbon solvent such as toluene to form a varnish having a viscosity at 40°C. of about 40 centipoises and a resin concentration of 35 to 55%, and kneading the varnish with an organic pigment using a sandmill, for example.

3. If desired, te resin in accordance with this invention can be used conjointly with the conventional rosin-type resins.

4. Since the resulting resin is of a pale color, the reproducibility of color is satisfactory for all pigments, and color formation also proves satisfactory.

5. The resin can be produced by a relatively simple process, and the cost of production can be reduced.

6. Since the resin is snythetic, its quality and cost are stable, and there is no unstable factor unlike naturally occurring resins.

When the resin in accordance with this invention is used for preparing offset printing inks, the following advantages can be obtained.

1. The resin obtained by the method of this invention can be used for preparing inks of various colors as a resin for an offset printing ink. This resin has printing effects and printability equal to, or superior to, those of the conventional rosin-modified phenol resins or alkyl-phenol resins. In addition, the resins of this invention can be produced at a lower cost than the rosin-modified phenol resins.

2. Offset printing inks can be produced by using the resin obtained by this invention in accordance with the same recipe and method of preparation as in the case of the conventional resins, and there is no need to install new equipment for preparation of inks. An offset printing ink can be obtained, for example, by dissolving 100 parts of the resin obtained by this invention in 0 to 150 parts of an oil such as a dry oil and 0 to 100 parts of a petroleum-type solvent at room temperature or at an elevated temperature to prepare a varnish having a viscosity of about 500 poises at room temperature, blending it with a pigment, and kneading them with a roll.

3. If desired, the resin obtained by the method of this invention can be used conjointly with the conventional resins.

4. Since the resin obtained is of a light color, the reproducibility of color is satisfactory for any kinds of pigments used, and the development of color also proves good.

5. The resin can be prepared by a relatively easy process, and the cost of production can be reduced.

The following Examples illustrate the present invention more specifically. It should be noted that the invention is in no way limited to these Examples.

EXAMPLE 1

A 2-liter stirrer-equipped autoclave was charged with 700g of dicyclopentadiene (DCPD) having a purity of 97% and 300g of mixed xylene of commercial grade, and they were reacted at 270° to 275°C. for 2.5 hours. After the reaction, the autoclave was cooled, and the contents were distilled to remove the unreacted DCPD, oligomers and xylene to form 643 g of a dicyclopentadiene resin (designated I) which had a softening point of 148°C. and a bromine value of 87.

This resin was placed in a reaction vessel equipped with a stirrer, and heated to 200°C. With stirring, 10g (0.102 mol) of maleic anhydride was added per 100g of the resin (I), and the reaction was performed for 3 hours to form an acid-modified resin (designated I-A) which had a softening point of 179°C. and an acid value of 52.1.

Subsequently, n-butanol was added in an amount of 1.0 mol per mol of the maleic anhydride which was added at the time of producing the resin (I-A), and the resin (I-A) was esterified in a closed reactor at 210°C. for 5 hours to form a modified resin (designated I-E) which had a softening point of 150°C. and an acid value of 45.

The modified resin (I-E) was dissolved in toluene so that the viscosity of the solution at 25°C. was 40 centipoises. The concentration of the resin at this time was 49% by weight. A toluene varnish of this resin having a resin content of 57% by weight was prepared. The varnish had a viscosity at 25°C. of 230 centipoises.

A red ink was prepared by adding Carmine 6B to this varnish. Likewise, a blue ink, a yellow ink and a black ink were prepared by adding phthalocyanine blue, bendizine yellow, and a combination of carbon black and a toluene solution of gilsonite, respectively. After standing for a week, the viscosity of each of the inks was measured. the viscosity increased by not more than 10% as compared with the viscosity immediately after ink preparation, and this shows a sufficient stability of the viscosity. When each of these inks was used for printing, the drying speed was the same as that of the conventional gravure ink using lime rosin, but the gloss and the uniformity of the printing surface were better.

EXAMPLE 2

An autoclave was charged with 550 g of DCPD having a purity of 95%, 150g of acrylic acid and 300g of mixed xylene, and they were allowed to react at 270°C. for 4 hours. After the reaction, the autoclave was cooled, and the contents were distilled to remove the unreacted monomer, oligomers and xylene. Thus, an acid-modified resin (designated II-A) was obtained in a yield of 97%. The resin II-A had a softening point of 182°C., a bromine value of 67, and an acid value of 68.

To the resin II-A was added 0.25 mol, per mol of the acrylic acid added before, of isodecanol, and the esterification reaction was performed at 210°C. for 2 hours to form a modified resin (designated II-E) having a softening point of 162°C. and an acid value of 7. When a solution of the resin II-E in toluene having a viscosity at 25°C. of 40 centipoises was prepared, the solution had a resin concentration of 47.7% by weight.

Inks of various colors were prepared using this resin II-E in the same way as in Example 1. The stability of viscosity was satisfactory, and both the drying speed and the printing effect of these inks were superior, so that these inks are fully feasible for use as paper gravure printing inks.

EXAMPLE 3

A $C_5$ fraction (having a boiling point of 28 to 60°C.) formed as a by-product from steam cracking of naphtha to produce ethylene, propylene, etc. was heated at 120°C. for 4 hours, and the unreacted $C_5$ fraction was removed by distillation. The residue contained 85% by weight of DCPD, and also a codimer of cyclopentadiene and isoprene or piperylene. 800 g of this fraction containing 85% of DCPD was reacted with 200g of mixed xylene at 280°C. for 2.5 hours. After the reaction, the product was treated in the same way as in Example 1 to form a resin (designated III) which has a softening point of 148°C. and a bromine value of 78.

To 100g of the resin III was added 0.2 mol of tetrahydrophthalic anhydride, and the addition reaction was performed under the same conditions as in Example 1. The resulting resin was then esterified with lauryl alcohol in an amount of 0.8 mol per mol of the acid anhydride used in the addition reaction. The esterification reactions were the same as in Example 1, and a modified resin (designated III-E) having a softening point of 148°C. and an acid value of 58 was obtained.

When a solution of this resin in toluene having a viscosity at 25°C. of 40 centipoises was prepared, the resin concentration of the solution was 47.5% by weight.

Gravure inks were prepared from this resin in the same way as in Example 1. The stability of the viscosity was the same as in Example 1, and the inks had a faster drying speed during printing than in the case of using lime resin. The printing effect were very superior, and the inks was found usable also as a process ink.

COMPARATIVE EXAMPLE 1

A fraction having a boiling point in the range of 162° to 220°C. formed as a by-product in the steam cracking of naphtha to produce ethylene, propylene, etc. was polymerized at 10°C. for 5 hours adding 0.5% by weight of a boron trifluorideldiethyl ether complex. Then, the catalyst was decomposed with an aqueous solution of sodium hydroxide, and by distillation, the unreacted oil and oligomers were removed, thereby to form an aromatic petroleum resin having a softening point of 150°C. and a bromine value of 23.

Maleic acid was added under the same conditions as in Example 1 to this resin, and then the resin was esterified with n-butanol to form a modified petroleum resin having a softening point of 148°C. and an acid value of 42.

When a solution of this resin is toluene having a viscosity of 40 centipoises at 25°C. was prepared, the solution had a resin concentration of 39% by weight.

Inks were prepared in the same way as in Example 1. It was found that the inks exhibited poor gloss and inferior uniformity of the printed surface as compared with the inks obtained in Example 1.

COMPARATIVE EXAMPLE 2

The acid-modified resin obtained in Example 3 was esterified with ethylene glycol in an equimolar amount to the acid anhydride used to modify the resin, at 210°C. for 3 hours. The resulting resin was partly insoluble in toluene. As regards the soluble portion, the preparation of a toluene solution of the resin having a viscosity of 40 centipoises at 25°C. required are in concentration of as low as 28% by weight. Thus, the resulting ink completely lacked gloss, and was not acceptable for practical purposes.

EXAMPLE 4

An acid-modified resin I-A was produced under the same conditions as in Example 1, and then oleyl alcohol was added in an amount of 0.91 mol per mol of the maleic anhydride added at the time of producing the resin I-A, followed by esterification at 230°C. for 3 hours to form a modified resin IV-E having a softening point of 141°C. and an acid value of 47.

EXAMPLE 5

Under quite the same conditions as in Example 2 an acid-modified resin II-A was prepared. 100g of the resin II-A was placed in a reaction vessel equipped with a stirrer, a thermometer, a side arm water trap and a condenser, and xylene was added to make it easy to remove the water to be generated. Under reflux, the reaction mixture was heated and melted at 250°C., and with stirring, 30g (0.111 mol) of stearyl alcohol was added. The esterification reaction was performed for 3 hours to form a modified resin (V-E) having a softening point of 139°C. and an acid value of 4.

EXAMPLE 6

An autoclave was charged with 500g of DCPD having a purity of 95%, 80g of maleic anhydride and 400g of iso-octane, and they were reacted for 5 hours at 270°C. After the reaction, the autoclave was cooled, and the contents were distilled to remove the unreacted monomer, oligomers and isooctane. Thus, an acid-modified resin (designated VI-A) was obtained in an amount of 540 g. This resin had a softening point of 172°C. and an acid value of 68.

To 100g of this resin VI-A was added 17g(0.131 mol) of octyl alcohol, and they were reacted in a closed vessel at 260°C. for 2 hours to form a modified resin (VI-E) having a softening point of 147°C. and an acid value of 56.

EXAMPLE 7

Under quite the same conditions as in Example 3, a cyclopentadiene resin (designated III) was produced. To 100g of the resin III was added 25g (0.164 mol) of tetrahydrophthalic anhydride, and they were reacted under the same conditions as in Example 1 to produce an acid-modified resin (designated VII-A) which had a softening point of 188°C. and an acid value of 81. 100g of the resin VII-A was placed in as reaction vessel equipped with a reflux condenser, and heated and melted at 230°C. 15 g (0.95 mol) of isodecanol was added, and reacted with the resin for 5 hours to form a modified resin (designated VII-E) having a softening point of 143°C. and an acid value of 68.

COMPARATIVE EXAMPLE 3

To 100g of the acid-modified resin I-A obtained in Example 1 was added 40 g (0.54 mol) of n-butanol, and they were reacted in a closed vessel at 230°C. for 5 hours to form a modified resin having a softening point of 135°C. and an acid value of 48.

COMPARATIVE EXAMPLE 4

To 100g of the acid-modified resin VI-A obtained in Example 6 was added 4g (0.0148 mol) of stearylalcohol, and they were reacted under the same conditions as in Example 2 to form a resin having a softening point of 163°C. and an acid value of 60.

COMPARATIVE EXAMPLE 5

To the acid-modified resin VI-A obtained in Example 6 was added ethylene glycol in an amount equimolar to the acid anhydride added to produce the acid-modified resin, and the esterification reaction was performed at 210°C. for 3 hours. The resulting resin was partly insoluble in toluene, and could not be made into an ink.

Using the resins obtained in Examples 4 to 7, Comparative Examples 3 and 4 and the control resin to be described below, varnishes were prepared in accordance with the following recipe. Using these varnishes inks were prepared, and the properties of the inks were tested.

Preparation of Varnishes

Linseed oil (70g) was added to 100g of the resin, and the mixture was heated at 230°C. for 2 hours. Then, 40g of a petroleum-type hydrocarbon solvent (specific gravity 0.85, aniline point 72.8, initial distillation point 272°C., end point 308°C.) was added and uniformly mixed to form a varnish. In the case of the control resin the varnish was prepared by adding 70g of linseed oil to 100g of the resin, heating the mixture for 30 minutes, and then adding 30g of the hydrocarbon solvent.

Preparation of Ink

Using three rolls, the following ingredients were kneaded. The amount of the petroleum-type hydrocarbon solvent was suitably varied so that the SR value of the ink became 17 to 18.

| | |
|---|---|
| Carmine 6B | 18 g |
| Vanish | 67 g |
| Solvent | 5 to 10 g |
| Abrasion-resistance Compound | 3 g |
| Dryer for ink | 2 g |

Performance test and result

1. Gloss: The ink (0.4 cc) was extended on art paper using an RI tester, and allowed to stand for 24 hours. Then, the gloss was measured by a 60° – 60° glossmeter.

2. Setting time: After extending 0.4 cc of the ink on art paper using the above-mentioned IR tester, another sheet of art paper was super-imposed on the ink-extended surface of the art paper. Using an RI tester roller, the degree of adhesion of the ink to the superimposed art paper was observed with the passage of time, and the time that elapsed until there was no adhesion of the ink was measured.

3. Misting: The ink (2.4 cc) was placed on Inkometer and it was rotated for 3 minutes at a speed of 1200 rpm. The degree of scattering of the ink to art paper placed under the roll was observed.

4. Drying time: The ink (0.4 cc) was spread on art paper using the above-mentioned RI tester, and then the drying time was measured by an ink drying tester.

The test results are shown in the following table.

| Type of the resin | Viscosity of the varnish (poises at 25°C.) | Gloss | Setting time (minutes) | Drying time (hours) | Misting |
|---|---|---|---|---|---|
| IV-E | 390 | 67 | 10 | 5.5 | Not occurred |
| V-E | 400 | 63 | 11 | 6.0 | Not occurred |
| VI-E | 480 | 63 | 11 | 5.5 | Not occurred |
| VII-E | 430 | 65 | 12 | 6.0 | Not occurred |
| Comparative Example 3 | 420 | 38 | 13 | 6.5 | Slightly occurred |
| Comparative Example 4 | 530 | 41 | 11 | 5.5 | Slightly occurred |
| Control resin* | 480 | 59 | 10 | 6.0 | Not occurred |

*A varnish was prepared by adding 70g of linseed oil to 100g of a rosin-modified phenol resin (Beckacite 1126, the product of Dainippon Ink and Chemicals petroleum type hydrocarbon solvent of the type described above.

What is claimed is:

1. A method for producing a resin for offset printing ink, which comprises (1) reacting (A) a dicyclopentadiene resin prepared by heat-polymerizing, in the absence of a catalyst, cyclopentadiene, dicyclopentadiene or an alkyl-substituted derivative thereof, said cyclopentadiene, dicyclopentadiene or alkyl-substituted derivative having a purity of at least 80% by weight and having a softening point in the range of from about 70° to about 200°C with (B) an unsaturated carboxylic acid or its anhydride selected from the group consisting of acrylic acid, methacrylic acid, maleic acid, maleic anhydride, tetrahydrophthalic acid, tetrahydrophthalic anhydride, fumaric acid, citraconic acid and itaconic acid, the proportion of the unsaturated carboxylic acid or its anhydride being 0.01 to 0.5 mol per 100 g of the dicyclopentadiene resin, and (2) esterifying the acid-modified resin of step (1) with an aliphatic saturated or unsaturated monohydric alcohol having 6 to 22 carbon atoms in an amount of 0.2 to 2.0 mols per mol of the unsaturated carboxylic acid or its anhydride used in said reaction to provide a resin having a softening point of at least 100°C.

2. The method of claim 1 wherein the amount of the monohydric alcohol is 0.25 to 1.0 mol per mol of the unsaturated carboxylic acid or its anhydride used.

3. The method of claim 1 wherein the heat-polymerization is conducted at a temperature of 250°–350°C.

4. The method of claim 3 wherein the heat-polymerization is conducted in the absence of a solvent.

5. The method of claim 3 wherein said heat-polymerization is conducted in the presence of an inert hydrocarbon solvent and the monomer concentration in the solvent is adjusted to 30 to 80% by weight.

6. The method of claim 1 wherein said alcohol is selected from the group consisting of heptanol, isodecanol, and tridecanol.

7. A resin for printing ink comprising the esterified reaction product of (A) dicyclopentadiene resin with (B) 0.01 to 0.05 mol per 100 grams of (A) of unsaturated carboxylic acid or anhydride wherein said dicyclopentadiene resin (A) is prepared by heat-polymerizing, in the absence of a catalyst, cyclopentadiene, dicyclopentadiene or an alkyl-substituted derivative thereof, said cyclopentadiene, dicyclopentadiene or alkyl-substituted derivative having a purity of at least 80% by weight, said dicyclopentadiene resin having a softening point in the range of from about 70° to about 200°C; said carboxylic acid or anhydride is selected from the group consisting of acrylic acid, methacrylic acid, maleic acid, maleic anhydride, tetrahydrophthalic acid, tetrahydrophthalic anhydride, fumaric acid, citraconic acid and itaconic acid;

said reaction product of (A) an (B) being esterified with an aliphatic saturated or unsaturated monohydric alcohol having 1 to 22 carbon atoms in an amount of 0.2 to 2.0 mols per mol of the unsaturated carboxylic acid or its anhydride (B) used in said reaction;

said resin having a softening point of at least 100°C.

8. The resin of claim 7 wherein said printing ink is an offset printing ink and said aliphatic saturated or unsaturated monohydric alcohol has 6 to 22 carbon atoms.

9. The resin of claim 8 wherein the amount of the monohydric alcohol is 0.25 to 1.0 mol per mol of the unsaturated carboxylic acid or its anhydride used in said reaction.

10. The resin of claim 8 wherein the amount of the unsaturated carboxylic acid or its anhydride (B) is 0.01 to 0.4 mol per 100 grams of the dicyclopentadiene resin (A).

11. The resin of claim 8 wherein the heat polymerization is conducted at a temperature of 250°–350°C in the absence of a solvent.

12. The resin of claim 8 wherein the heat polymerization is conducted at a temperature of 250° – 350°C in the presence of an inert hydrocarbon solvent and the monomer concentration in the solvent is adjusted to 20 to 80% by weight.

13. The resin of claim 8 wherein said monohydric alcohol is selected from the group consisting of heptanol, isodecanol and tridecanol.

* * * * *

UNITED STATES PATENT AND TRADEMARK OFFICE
CERTIFICATE OF CORRECTION

PATENT NO. : 3,984,381
DATED : October 5, 1976
INVENTOR(S) : TSUCHIYA, ET AL.

It is certified that error appears in the above—identified patent and that said Letters Patent are hereby corrected as shown below:

Claim 7, line 3, delete "0.05", insert -- 0.5 --

Claim 7, line 17, delete "an", insert -- and --

Signed and Sealed this

Fourteenth Day of December 1976

[SEAL]

Attest:

RUTH C. MASON
Attesting Officer

C. MARSHALL DANN
Commissioner of Patents and Trademarks